(12) United States Patent
    Podl

(10) Patent No.: US 8,094,333 B2
(45) Date of Patent: Jan. 10, 2012

(54) SYSTEM AND METHOD FOR OPTIMIZING THE PERFORMANCE FACTORS OF A MULTI-FUNCTION PERIPHERAL (MFP)

(75) Inventor: Brian Podl, Newport Beach, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1323 days.

(21) Appl. No.: 11/729,328

(22) Filed: Mar. 27, 2007

(65) Prior Publication Data

US 2008/0239367 A1    Oct. 2, 2008

(51) Int. Cl.
    G06F 3/12      (2006.01)
    H04N 1/00      (2006.01)
(52) U.S. Cl. ........................................ 358/1.15; 358/400
(58) Field of Classification Search .................. 358/1.1, 358/1, 12, 1.14, 1.15, 1.17, 474, 400, 468
    See application file for complete search history.

(56) References Cited

U.S. PATENT DOCUMENTS

| | | | | |
|---|---|---|---|---|
| 5,471,564 | A * | 11/1995 | Dennis et al. | 358/1.15 |
| 7,130,559 | B2 * | 10/2006 | Kimura et al. | 399/109 |
| 2005/0213145 | A1 * | 9/2005 | Clark et al. | 358/1.15 |
| 2007/0121172 | A1 * | 5/2007 | Hamada | 358/419 |
| 2009/0097067 | A1 * | 4/2009 | Cook et al. | 358/1.15 |
| 2010/0073725 | A1 * | 3/2010 | Tian | 358/1.15 |

* cited by examiner

*Primary Examiner* — Gabriel Garcia

(57) ABSTRACT

A method of controlling a multi-function peripheral (MFP) device is disclosed. In one embodiment, the method includes i) storing data associated with the operation of the MFP device, wherein the MFP device includes at least one hardware element, ii) analyzing the stored data so as to optimize performance factors (e.g., power savings, job speed, use of consumable material, and MFP wear and tear, etc.) of the MFP device and iii) controlling the at least one hardware element based on the analysis. In one embodiment, the data includes at least one of the following: i) a first data associated with a user's MFP device settings, ii) a second data associated with a user's MFP device usage statistics, iii) a third data which is real time data associated with the MFP device operation and iv) a fourth data associated with MFP hardware characteristics.

25 Claims, 5 Drawing Sheets

SYSTEM AND METHOD FOR OPTIMIZING THE PERFORMANCE FACTORS OF A MULTI-FUNCTION PERIPHERAL (MFP)

BACKGROUND OF THE INVENTION

1. Field of the Invention

This invention relates to multi-function peripheral (MFP) devices, and particularly to a system and method for optimizing certain performance factors (e.g., power savings and/or job speed) of an MFP device.

2. Description of the Related Technology

Recently, multi-function peripheral (MFP) devices (or "all in one" devices), which have multiple functions, have been widely used. Typically, MFP devices can act as a printer, a scanner, a fax machine and a photocopier. These devices are becoming a popular option for small office/home office (SOHO) users because they are less expensive than buying three or four separate devices. MFP devices are also known as multifunction printers.

Most MFP devices can be used as standalone devices for faxing and copying. However, in many situations, they are connected to a computer and/or a network to provide various functions such as color scanning, page printing, scanning and emailing, and additional fax management options.

SUMMARY OF CERTAIN INVENTIVE ASPECTS

One aspect of the invention provides a method of controlling a multi-function peripheral (MFP) device, comprising: i) storing data associated with the operation of the MFP device, wherein the MFP device includes at least one hardware element, ii) analyzing the stored data so as to optimize performance factors of the MFP device and iii) controlling the at least one hardware element based on the analysis.

Another aspect of the invention provides a system for controlling a multi-function peripheral (MFP) device, comprising: i) a database configured to store data associated with the operation of the MFP device, wherein the MFP device includes at least one hardware element and ii) a controller configured to analyze the stored data so as to optimize at least one performance factor of the MFP device and control the at least one hardware element based on the analysis.

Another aspect of the invention provides a multi-function peripheral (MFP) device, comprising: i) a database configured to store data associated with the operation of the MFP device, ii) at least one hardware element and iii) a controller configured to analyze the stored data so as to optimize at least one performance factor of the MFP device and control the at least one hardware element based on the analysis.

Still another aspect of the invention provides a one or more processor-readable storage devices having processor-readable code embodied on the processor-readable storage devices, the processor-readable code for programming one or more processors configured to perform a method of controlling a multi-function peripheral (MFP) device, the method comprising: i) storing data associated with the operation of the MFP device, wherein the MFP device includes at least one hardware element, ii) analyzing the stored data so as to optimize performance factors of the MFP device and iii) controlling the at least one hardware element based on the analysis.

Yet another aspect of the invention provides a hardcopy input/output device, comprising: i) a first database configured to store first data associated with a user's hardcopy device settings, ii) a second database configured to store second data associated with a user's hardcopy device usage statistics, iii) at least one hardware element and iv) a controller configured to analyze at least one of the first and second data so as to optimize at least two performance factors of the hardcopy device and control the at least one hardware element based on the analysis.

BRIEF DESCRIPTION OF THE DRAWINGS

Embodiments of the invention will be described in conjunction with the following drawings, in which like reference numerals indicate identical or functionally similar elements.

DETAILED DESCRIPTION OF CERTAIN INVENTIVE EMBODIMENTS

Typical MFP devices will have a simplistic built-in algorithm which merely predicts user power save timeout, and neither takes advantage of statistical data nor employs user settings in making the prediction. Because of the simplicity of the prediction, power savings and speed cannot be adjusted to be optimal. Furthermore, there is no user settable user interface feature to set the MFP device to perform the way the user wants.

One embodiment of the invention is a system for helping predict, for example, when to print, turn on/off or otherwise control printer engine or control other MFP hardware to optimize certain performance factors (e.g., power savings, job speed, or combination thereof) of an MFP device. In one embodiment, the system analyzes data associated with at least one of the following: i) user settings data, ii) user usage statistics data, iii) real time data and iv) MFP hardware characteristics data. In another embodiment, other data can also be used as long as it is associated with optimizing performance factors of the MFP device.

Figure 1:
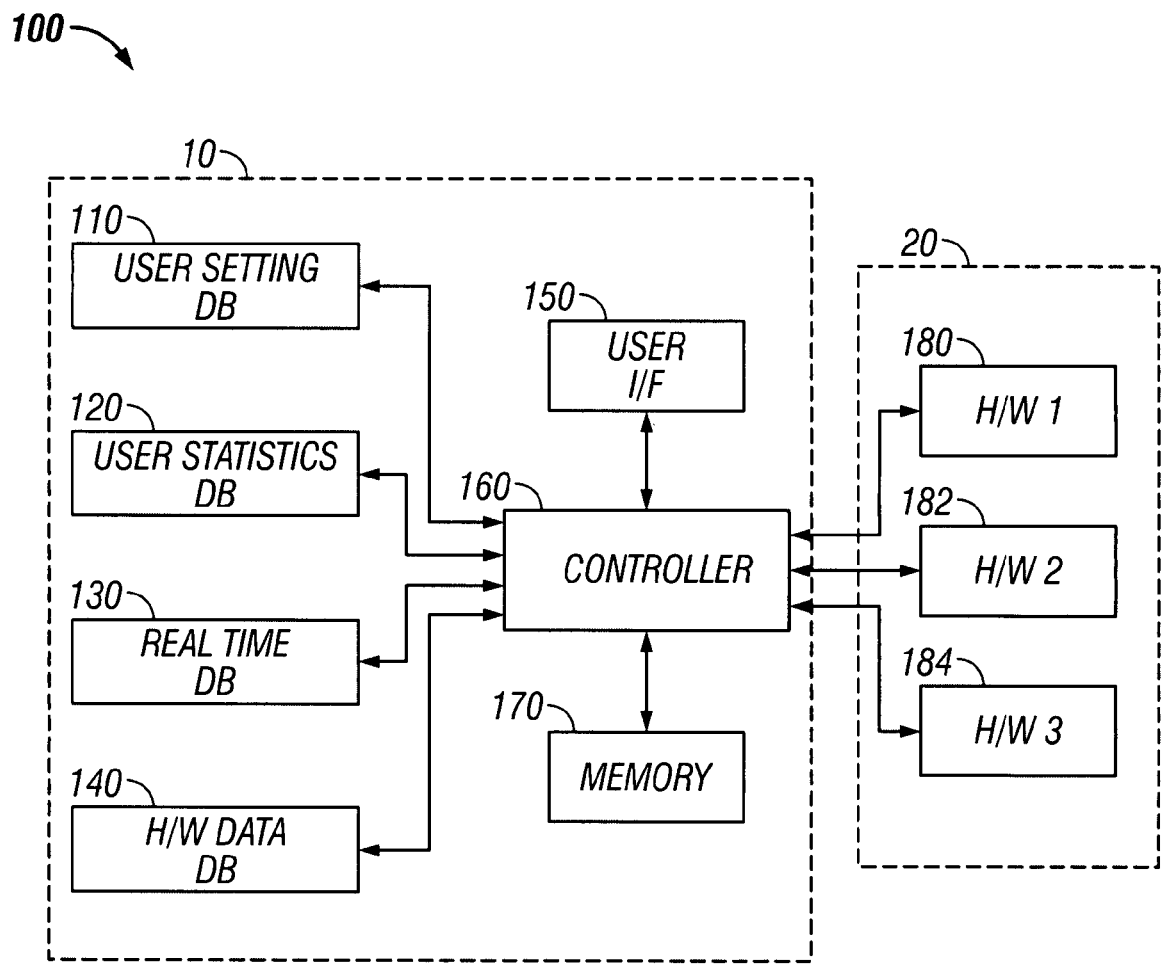
FIG. 1 illustrates an exemplary block diagram of a system for optimizing certain performance factors (e.g., power savings and/or job speed) of a multi-function peripheral (MFP) device according to one embodiment of the invention.

FIG. 1 illustrates an exemplary block diagram of a system 100 for optimizing certain performance factors (e.g., power savings and/or job speed) of a multi-function peripheral (MFP) device according to one embodiment of the invention. The system 100 includes a prediction/optimization (hereinafter "optimization") apparatus 10 and an MFP portion 20. In one embodiment, the MFP portion 20 (or MFP device) is in data communication with the optimization apparatus 10 and/or another MFP device (not shown) with the use of either a known (public) communication protocol, for example, TCP/IP, or a proprietary communication protocol. In one embodiment, the MFP device includes an SCX-6320F available from Samsung Electronics. In another embodiment, the MFP device may include all competitive products, in addition to in-house developed printers and any MFP printers (either color or monochrome MFP printer).

In one embodiment, the system 100 as a whole may be implemented with an MFP device. In this embodiment, the optimization apparatus 10 and the MFP portion may reside within the MFP device. In another embodiment, the MFP portion 20 alone may be an MFP device. In this embodiment, the optimization apparatus 10 may be located outside the MFP device (or MFP portion 20). In either embodiment, the apparatus 10, while being in data communication with the MFP portion 20 (or MFP device), controls hardware elements 180-184 so as to optimize certain performance factors (power savings, job speed, machine wear and tear, use of consumable materials, combination thereof, etc.; will be described in greater detail) of the MFP device. The hardware elements 180-184 include, but are not limited to, a printer engine, a scanner engine, a copier engine, a fax engine, a CPU, a memory, ASICs and electrical or mechanical elements of the MFP device.

In one embodiment, the optimization apparatus 10 includes a user setting database (DB or a memory; hereinafter will be referred to a DB for convenience) 110, a usage statistics DB 120, a real time data DB 130 and a hardware (H/W) data DB 140. In one embodiment, the DBs 110-140 include, but are not limited to, data associated with at least one of the following:

A. The user setting DB 110:
   Settings from a user on preference to save power, last page out improvement time, combination thereof
   Advanced settings such as different modes based on time of a day
   Automatic feature to optimize as data is collected
B. The user usage statistics DB 120:
   Job size in pages
   Job/page size data
   Length of time between jobs
   Usage time peaks (e.g., every day between 3 pm and 5 pm usage peaks)
   Job/page receive time
   Job/page process time
   Job/page wait time
   Individual user usage for above
   Group and machine usage for above
   User interface for the user to control database information. (e.g., delete user, ignore guest user, etc.)
C. The real time data DB 130:
   Current data received (e.g., in bytes)
   Process time in raster image processing (RIP) (e.g., percentage of current page done, prediction of time left to finish current page, average page RIP time for this job)
   Type of job being processed. (e.g., power point, text)
   Number of pages in system and data on each page which are, e.g., being received, spooled, RIP processed, printed or sent to output
      Data on each page (e.g., page size, size of data, type of data, percent processed, stage in pipeline)
D. The hardware data DB 140:
   Power saving characteristics of an MFP device and control thereof
   Any MFP device or sub-unit (computer-like, electrical or mechanical) associated data on its behavior including power usage, time data, etc.
   Cycle up/down time and control thereof (e.g., is it settable?, settings possible)
   Printing time and other MFP device time
      From "cold" start
      From "warm" start
      Command sent immediately after a cycle down
      Time allowed between commands to print pages (may be more important if cycle down time is not settable)
   Duplex printing path characteristics
      Modes that can be set (e.g., normal, fast)
      Printing order required for each mode
      Number of sheets in duplex path
      Time to print x sheets (may be mode dependent)
      Control protocol information
         Time windows (e.g., time window to print another sheet before a forced switch to print opposite sides of sheets already in the paper path)
      Concurrency limitations
      Other information for control as needed for MFP devices such as a scanner, a fax, a copier, etc.

In one embodiment, the optimization apparatus 10 may predict when, where, how to control the hardware elements 180-184 (e.g., printer engine) within an MFP device in order to optimize, for example, power savings and/or job speed. Examples of controlling the hardware elements 180-184 include, but are not limited to, printer engine command to cycle up or cycle down, print page or duplex commands, scan commands, fax commands and computer device power save commands.

In one embodiment, the optimization apparatus 10 may optimize the job speed of the MFP device. In this embodiment, power savings may be sacrificed because certain hardware elements of the MFP device can be maintained in a more ready state that typically uses more power to ensure faster performance as opposed to being in sleep mode which would generally result in a slower speed, since devices need to be warmed up. In another embodiment, the apparatus 10 may optimize power savings of the MFP device at the expense of the job speed. In another embodiment, the apparatus 10 may allow weighted optimization settings between power savings and job speed (e.g. weight 50% power savings and 50% job speed) allow weighted optimization settings between power savings and job speed (e.g. weight 50% power savings and 50% job speed). The above optimization may be performed manually (e.g., only when instructed or set by a user) or automatically (regardless of a user instruction or setting). This applies to the remaining embodiments.

In another embodiment, the apparatus 10 may optimize reducing wear and tear of certain hardware elements against increasing job speed of the MFP device. Typically, wear and tear of certain hardware elements (e.g., belts, motors, etc.) of the MFP device tends to rise with job speed increase because the hardware elements are kept in a more ready state. For example, when the next page is not ready in time, some engines may introduce "dead cycles" which means that the engine motors, belts and other moving hardware keep moving as if there was a page in the printing path but the page was not picked. In this situation, the apparatus 10 (or a user) may opt for reducing wear and tear of the hardware elements against increasing job speed. On the contrary, depending on the situation, the apparatus 10 may favor increasing job speed of the MFP device to the sacrifice of hardware element wear and tear. In still another embodiment, a relative percentage (or weight) may be given between performance factors discussed above (will be described with respect to FIG. 3).

Figure 3:
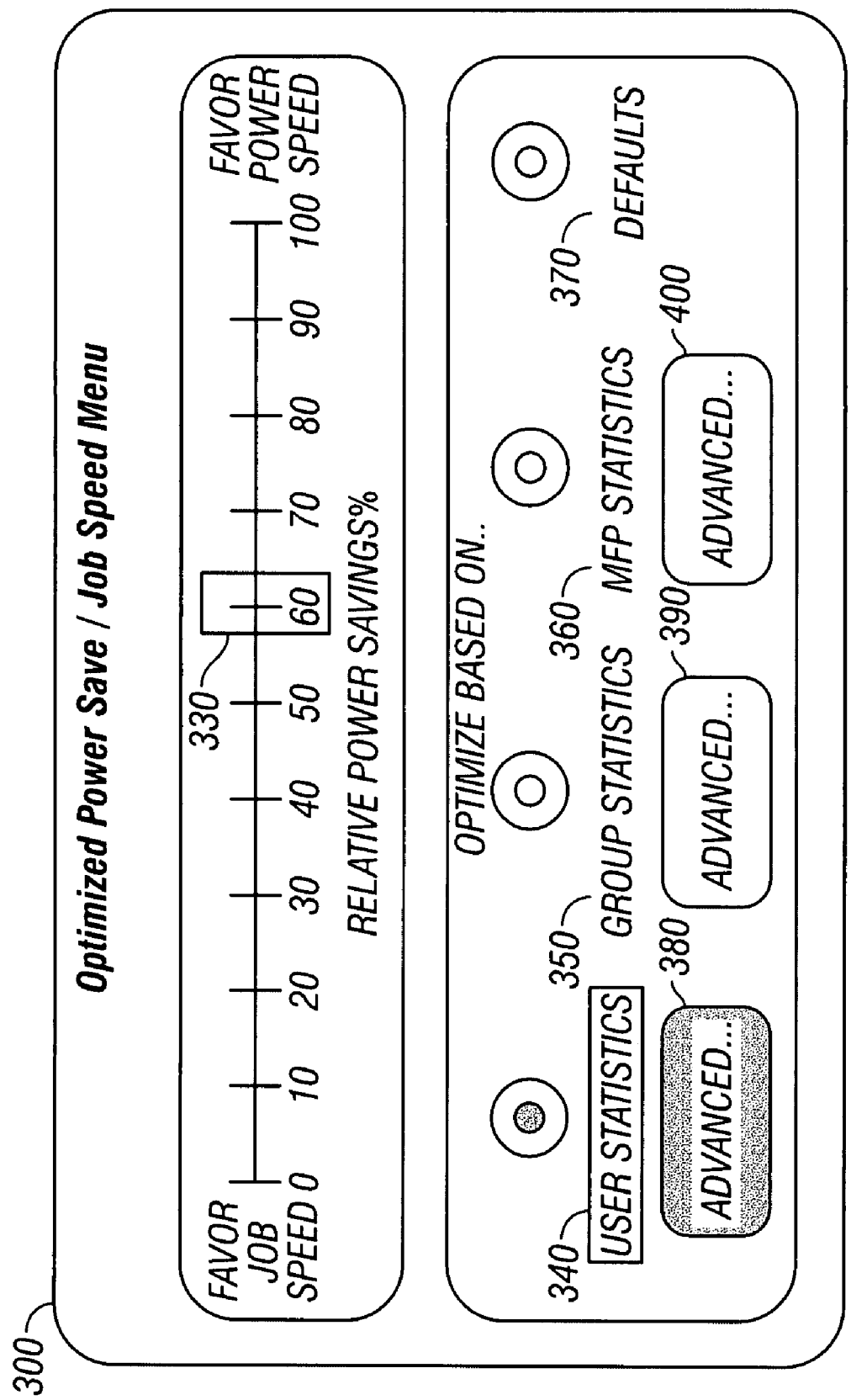
FIG. 3 illustrates an exemplary menu for optimizing certain performance factors of an MFP device according to one embodiment of the invention.

FIG. 3 illustrates an exemplary menu 300 for optimizing certain performance factors of an MFP device according to one embodiment of the invention. In one embodiment, the "optimize power save/job speed" menu 300 can be located, for example, in the control panel of the MFP device. In one embodiment, the menu 300 may be part of the user interface 160. With the use of this menu 300, the settings of the apparatus 10 can be altered by way of, for example, a selection slider 330 of the menu 300, to optimize, for example, power savings, job speed, or a combination (e.g., 90% power savings and 10% job speed, or 60% power savings and 40% job speed). In one embodiment, the user interface 160 may further include other settings such as time of day settings, individual user settings, etc.

In one embodiment, as illustrated in FIG. 3, the menu 300 may provide other user settable options such as user statistics 340 (e.g., individual users), group statistics 350 (e.g., groups of an organization: human resource group, R & D group, accounting group, etc.), MFP statistics 360 (e.g., all of the groups) and defaults 370. In one embodiment, by way of the user and group statistics 340, 350, a certain user may be deleted from a database, a guest user ignored, and a user added to and deleted from a group. Time factors may be adjusted, for example, favoring faster job speed from 3 pm to 5 pm. Certain features may be set as defaults 370.

In another embodiment, the menu 300 may further include advanced options 380-400 as illustrated in FIG. 3. In one embodiment, the advanced options 380-400 may include, but not limited to, i) adding/deleting a specific user or group from the statistics calculations, ii) adjusting power savings percentage for a single user/group, iii) resetting/adjusting average job size (pages, bytes) for a user, for a group, for the machine and iv) time of day control (e.g., favor power save at night, favor job speed during a day). It is appreciated that the menu options 340-400 are merely examples, and certain options may be omitted from, and more options can be added to the menu 300.

Referring back to FIG. 1, the apparatus 10 further includes a user interface 150, a controller 160 and a memory 170. The memory 170 stores a procedure or algorithm configured to perform an optimization procedure 200 (see FIG. 2) of the MFP device. In another embodiment, the procedure 200 may be embedded in the controller 160. In one embodiment, the controller 160, being in data communication with the user interface 150 and the memory 170, analyzes the data stored in the DBs 110-140 and controls the hardware elements 180-184 so as to optimize at least one of the performance factors (as discussed above) of the MFP device. In another embodiment, although not shown, the controller 160 may control certain software components to optimize performance factors of the MFP device.

Figure 2:
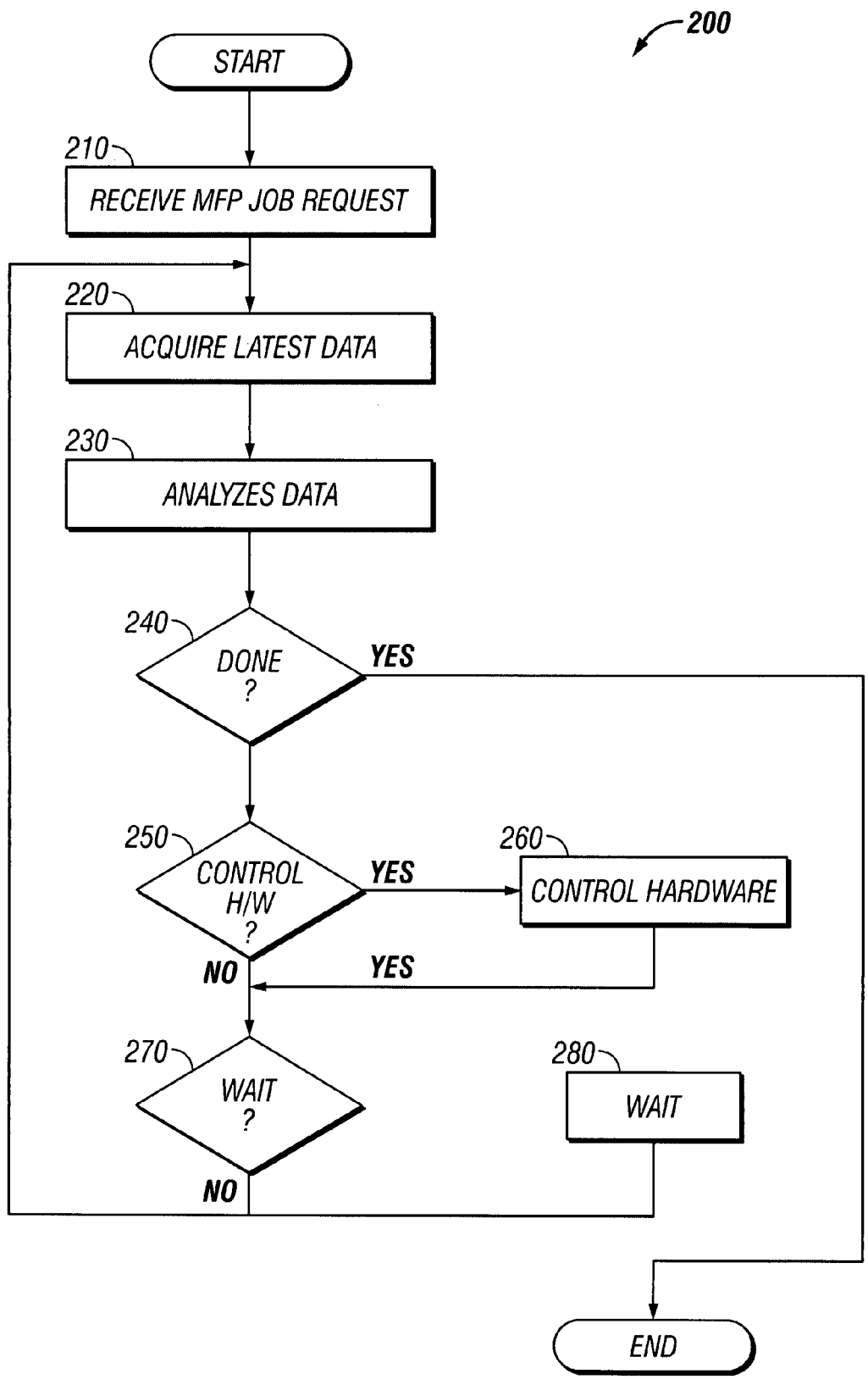
FIG. 2 illustrates an exemplary flowchart of a procedure for optimizing certain performance factors of an MFP device according to one embodiment of the invention.

FIG. 2 illustrates an exemplary flowchart of a procedure 200 for optimizing certain performance factors of an MFP device according to one embodiment of the invention. In the procedure 200, depending on circumstances, additional states may be added, others removed, or the order of the states changes. Furthermore, more than two states can be combined into one state. Referring to FIGS. 1 and 2, the procedure 200 will be described.

The optimization apparatus 10 receives an MFP job request (210). Examples of the job request includes, but not limited to, printing, faxing, coping and scanning. The optimization apparatus 10 acquires the latest data from the DBs 110-140 (220). The latest data includes, but not limited to, at least one of user setting data, usage statistics data, real time data and MFP hardware characteristics data from the DBs 110-140. The optimization apparatus 10 analyzes the acquired data (230). In one embodiment, the optimization apparatus 10 may continuously analyze the acquired data until the requested job has been finished.

In one embodiment, the analyzing may include averaging or appropriate calculation (e.g., mean) for, for example, i) user job length in pages and bytes, ii) processing time, iii) hardware characteristics data including default data collected by averaging or appropriate calculation and iv) long term simulations of an "average" customer usage, and also current data collected. Also other factors such as time of day usage, etc. could be factored into the calculation.

In another embodiment, analyzing may also include providing probabilities of such user usage which can be calculated to predict how to control the hardware elements 180-184 so as to, e.g., save power or increase job speed, or for each factor having a relative weighting. In one embodiment, the calculations would be made to be beneficial (for job speed and/or power save) in the long run as the sample rate grows. In one embodiment, short term fluctuations may occur with respect to the prediction. For example, if a page has been received as x bytes so far, and data is still coming in over the network, the prediction of the total size of the job and time to process it may be best predicted by determining past performance.

The apparatus 10 determines whether the requested job (or both the analyzing and requested job) has been completed (240). If completed in state 240, the procedure with respect to the requested job ends. In this embodiment, there may be no need to further analyze the obtained data because the job has already been completed. If the requested job has not been completed, the apparatus 10 determines whether to control a particular hardware element (250), and controls the hardware element if needed (260).

In one embodiment, the apparatus 10 (or the controller 160) performs at least one of the following (but not limited to) controls with respect to the hardware elements 180-184: i) power up control, ii) cycle down control, iii) power save control (e.g., enter sleep mode and leave sleep mode), iv) run at full speed or half speed, etc., v) mode of operation (e.g., fast duplex, slow duplex, toner save mode), vi) batch jobs and vii) print commands, scan commands, fax commands, any H/W device commands.

In state 250, controlling hardware elements may not be needed in a certain situation, for example, where the current hardware element setting is working well. The optimization apparatus 10 determines whether it needs to wait for a period of time, for example, a short delay (to be described later) between first page printing and second page printing in FIG. 5 (270). If needed, the optimization apparatus 10 waits for the period of time (280). After waiting or if waiting is not needed in state 270, the procedure returns to the state 220.

In one embodiment, the states 240-250 and 270-280 may be omitted. In this embodiment, the state 260 immediately follows the state 230, and the procedure 200 ends after state 260 is performed.

In one embodiment, the procedure 200 illustrated in FIG. 2 is implemented in a conventional programming language, such as C or C++ or another suitable programming language. In one embodiment of the invention, the program is stored on a computer accessible storage medium of the optimization apparatus 10. In another embodiment, the program can be stored in other system locations so long as it can perform the procedure 200 according to embodiments of the invention. In this embodiment, the program may be stored in a server computer and downloaded to the optimizing system 10. The storage medium may comprise any of a variety of technologies for storing information. In one embodiment, the storage medium comprises a random access memory (RAM), hard disks, floppy disks, digital video devices, compact discs, video discs, and/or other optical storage mediums, etc.

In another embodiment, the optimization apparatus 10 comprises a processor (not shown) configured to or programmed to perform the procedure 200. The program may be stored in the processor or a memory of the apparatus 10. In various embodiments, the processor may have a configuration based on Intel Corporation's family of microprocessors, such as the Pentium family and Microsoft Corporation's windows operating systems such as Windows 95/98/2000/XP or Windows NT. In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 2000/9x/ME/XP, Macintosh OS, OS/2 and the like. In another embodiment, the procedure 200 can be implemented with embedded software.

COMPARISON EXAMPLES

Figure 4:
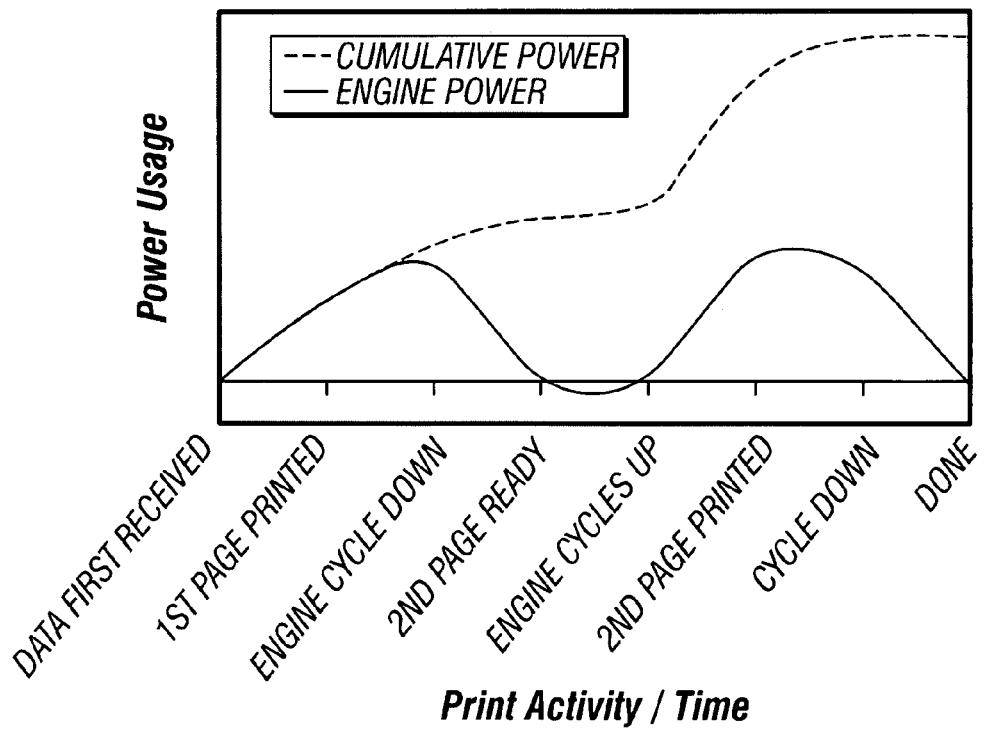
FIG. 4 illustrates an exemplary graph showing the relationship between the power consumption and job speed according to a typical MPF device.
Figure 5:
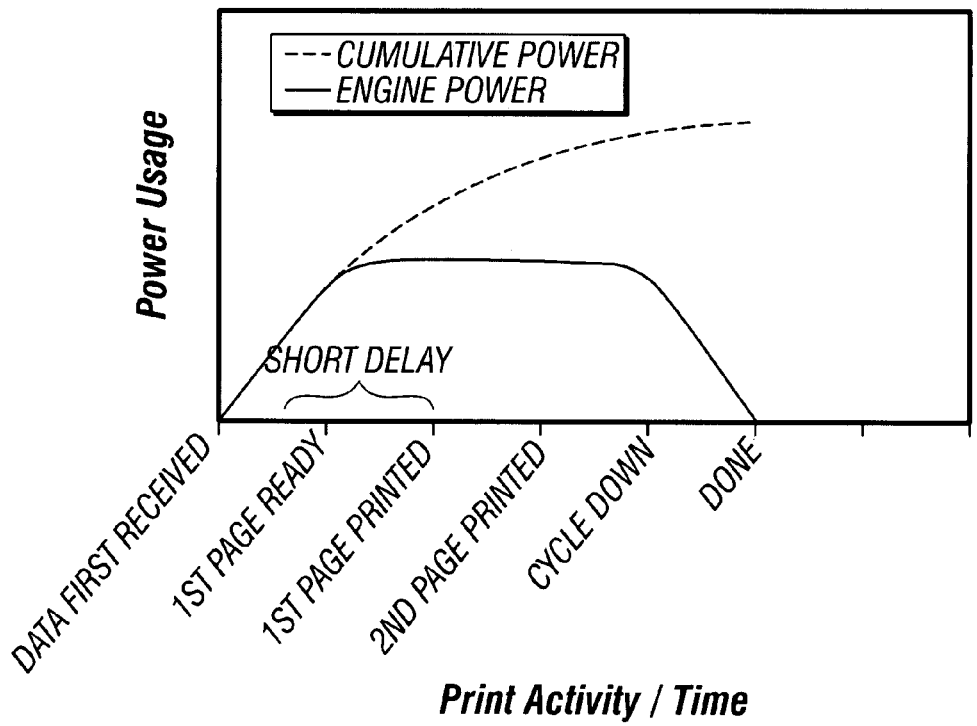
FIG. 5 illustrates an exemplary graph showing the relationship between the power consumption and job speed of an MPF device according to one embodiment of the invention.

FIG. 4 illustrates an exemplary graph showing the relationship between the power consumption and job speed according to a typical MPF device (without prediction (optimization)). FIG. 5 illustrates an exemplary graph showing the relationship between the power consumption and job speed of an MPF device according to one embodiment of the invention (with prediction (optimization)). For convenience, both examples are obtained based on two page printing.

1. Two Page Job Without Prediction (Optimization)

In this example, as shown in FIG. 4, the particular printer engine cycles up when a printing command is received, and cycles down if no print command is received for a certain period of time. In this example, after printing the first page, a delay, which is just longer than the time of the cycle down, happened to occur just before the second page is ready to print. In this situation, the engine cycle is required to return to the "cycle up" state in order to print the second page. In this example, the "engine cycles down" and subsequent "engine cycles up" caused a delayed printing and increased power consumption.

2. Two Page Job With Prediction (Optimization)

In this example, the optimization apparatus 10 analyzed available data (e.g., second page coming time, data size, expected completion time, and statistical data, etc.) and prevented possible "engine cycles down" from occurring between the first page printing and second page printing. This subsequently avoided "engine cycles up" as there was no need to restore the engine cycles up. A short delay may occur between the "first page ready" mode and "the first page printed" mode. The optimization apparatus 10 can control the printer engine so that the engine does not experience "engine cycles down" before the second page is printed. In this example, both power savings and job speed have been improved by analyzing at least one (e.g., hardware data and real time data) of the four data (A-D) as discussed above.

However, depending on embodiments, there may be a trade off between power savings and job speed increase. For example, in the above case if power saving is highly favored over job speed, then the optimization apparatus 10 can be adapted to wait until the whole job was received or to perform "batch" jobs together to ensure better power use. In the case of favoring job speed, the optimization apparatus 10 may print as soon as possible.

Figure 6A:
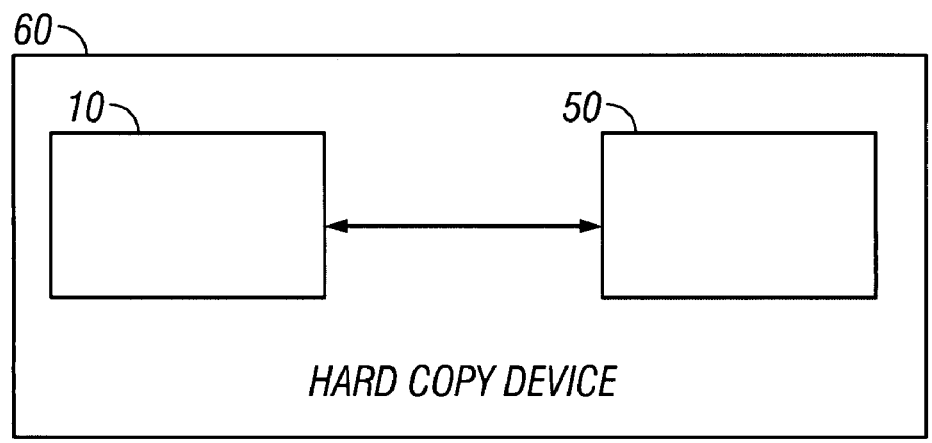
FIGS. 6A and 6B illustrate exemplary block diagrams of a system for optimizing certain performance factors (e.g., power savings and/or job speed) of a hardcopy input/output device according to another embodiment of the invention.
Figure 6B:
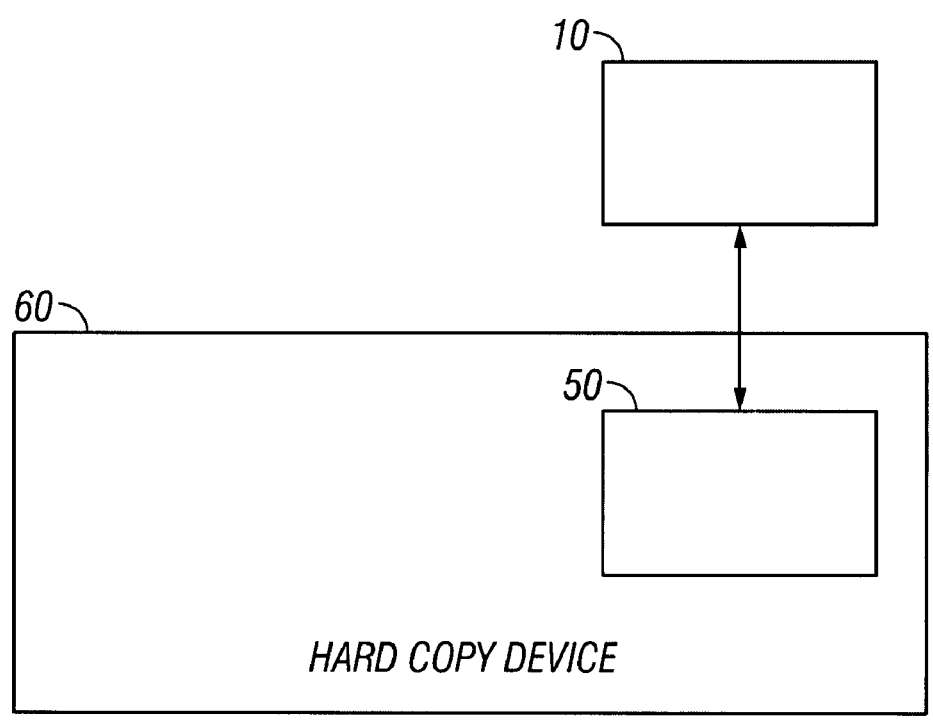

FIGS. 6A and 6B illustrate exemplary block diagrams of a system for optimizing certain performance factors (e.g., power savings and/or job speed) for a hardcopy device according to another embodiment of the invention. Although the apparatus 10 has been described so far with respect to an MFP device, the apparatus 10 can also be applied to other devices, for example, a hardcopy input/output device 60. In one embodiment, the hardcopy device 60 may be, by way of example, an MFP device, a scanner device, a fax machine, a printer, a copier and an all-in-one device. In another embodiment, the device 60 may include other hardcopy input/output devices which have been developed or may be developed in the future. The device 60 can be connected to a PC via a USB connection or connected to a network via, for example, an Ethernet connection. In another embodiment, the device 60 does not require to be connected to a PC. In one embodiment, the apparatus 10 may control hardware elements 50 so as to optimize certain performance factors of the device 60. In one embodiment, the apparatus 10 may reside either within the hardcopy device 60 as shown in FIG. 6A, or be located outside the hardcopy device 60 as shown in FIG. 6B.

Additional Embodiments

In one embodiment, the optimization apparatus 10 may optimize any devices or hardware elements (e.g., memory, CPU, ASICs, any mechanical hardware, electrical hardware, computer-like hardware, etc.) that an MFP device or a hardcopy device has the ability to connect with either internally or externally. In another embodiment, the optimization apparatus 10 may optimize performance factors of a plurality of MFP devices (or hardcopy devices), being in data communication with each other. In another embodiment, the optimization apparatus 10 may optimize consumable materials or elements such as ink, toner, paper, cartridges, etc. In another embodiment, the optimization apparatus 10 may have the ability to adjust using user interface (UI), relative favoring of any combination of power save, job speed, consumable use and wear and tear. Another embodiment is automatic optimization of the device (MFP device or hardcopy device) without any UI for the user. Another embodiment is that the statistical data may also be stored remotely from the MFP, or any combination of remote or internal storage of data used for the calculations. In another embodiment, analyzing the data may be done locally, remotely or combination thereof.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of controlling a multi-function peripheral (MFP) device, comprising:
    storing data associated with the operation of the MFP device, wherein the MFP device includes at least one hardware element;
    analyzing the stored data so as to optimize at least two performance factors of the MFP device, the performance factors including i) power savings, ii) job speed, iii) use of consumable material, and iv) MFP wear and tear;
    associating the data including a first data with a user's settings for the MFP device and at least one of the following: i) second data associated with a user's usage statistics for the MFP device, ii) third data which is real time data associated with the MFP device operation and iii) fourth data associated with MFP hardware characteristics;

associating the second data with individual user usage for the following data including: the job size in page, the job/page size data, the length of time between jobs, the job/page receive time, the job/page process time, the job/page wait time, and usage peak time during the day; and controlling the at least one hardware element based on the analysis.

2. The method of claim 1, wherein the first data is associated with settings from a user on preference to save power, last page out improvement time, or a combination thereof.

3. The method of claim 1, wherein the third data is associated with a percentage of current page done.

4. The method of claim 1, wherein the fourth data is associated with power saving characteristics of the MFP device and control thereof.

5. The method of claim 1, wherein the analyzing is performed so as to weight one of the performance factors higher than the remaining factors.

6. The method of claim 1, wherein the analyzing is performed so as to provide a relative weighting of at least two performance factors among i)-iv).

7. The method of claim 1, wherein the consumable material includes at least one of the following: ink, toner, paper and cartridges.

8. The method of claim 1, wherein the analyzing is performed so as to generate averaging or appropriate calculation for at least two of the first through fourth data.

9. The method of claim 1, wherein the analyzing provides prediction of a future MFP device behavior based on at least one of the first through fourth data.

10. The method of claim 1, wherein the first data is associated with advanced settings for different modes based on time of a day.

11. The method of claim 1, wherein the second data is associated with group and machine usage for the following data including: the job size in page, the job/page size data, the length of time between jobs, the job/page receive time, the job/page process time, the job/page wait time, and usage peak time during the day.

12. The method of claim 1, wherein the second data is associated with a user interface for a user to control database information.

13. The method of claim 1, wherein the third data is associated with the type of job being processed.

14. The method of claim 1, wherein the fourth data is associated with MFP behavior data including power usage and time data.

15. The method of claim 1, wherein the fourth data is associated with cycle up/down time and control thereof.

16. The method of claim 1, wherein the fourth data is associated with cold start operation or warm start operation.

17. The method of claim 1, wherein the fourth data is associated with commands sent immediately after a cycle down.

18. The method of claim 1, wherein the fourth data is associated with the time allowed between commands to print pages.

19. The method of claim 1, wherein the fourth data is associated with the printing order required for each mode.

20. The method of claim 1, wherein the fourth data is associated with the time window for multiple sheet printing.

21. A system for controlling a multi-function peripheral (MFP) device, comprising:

a memory configured to store data associated with the operation of the MFP device, wherein the MFP device includes at least one hardware element;

a controller configured to analyze the stored data so as to optimize at least two performance factors of the MFP device and control the at least one hardware element based on the analysis, the performance factors including i) power savings, ii) job speed, iii) use of consumable material, and iv) MFP wear and tear; and wherein:
the data includes a first data associated with a user's settings for the MFP device and at least one of the following: i) second data associated with a user's usage statistics for the MFP device, ii) third data which is real time data associated with the MFP device operation and iii) fourth data associated with MFP hardware characteristics; and the second data is associated with individual user usage for the following data including: the job size in page, the job/page size data, the length of time between jobs, the job/page receive time, the job/page process time, the job/page wait time, and usage peak time during the day.

22. The system of claim 21, further comprising a plurality of additional MFP devices being in data communication with the MFP device, wherein the controller is further configured to optimize performance factors of at least two of all of the MFP devices.

23. A multi-function peripheral (MFP) device, comprising:
a memory configured to store data associated with the operation of the MFP device;
at least one hardware element;
a controller configured to analyze the stored data so as to optimize at least two performance factors of the MFP device and control the at least one hardware element based on the analysis, the performance factors including i) power savings, ii) job speed, iii) use of consumable material, and iv) MFP wear and tear; and wherein:
the data includes a first data associated with a user's settings for the MFP device and at least one of the following: i) second data associated with a user's usage statistics for the MFP device, ii) third data which is real time data associated with the MFP device operation and iii) fourth data associated with MFP hardware characteristics; and the second data is associated with individual user usage for the following data including: the job size in page, the job/page size data, the length of time between jobs, the job/page receive time, the job/page process time, the job/page wait time, and usage peak time during the day.

24. A hardcopy input/output device, comprising:
a first memory configured to store first data associated with a user's settings for the hardcopy device;
a second memory configured to store second data associated with a user's usage statistics for the hardcopy device;
at least one hardware element; and
a controller configured to analyze at least one of the first and second data so as to optimize at least two performance factors of the hardcopy device and control the at least one hardware element based on the analysis, the performance factors including i) power savings, ii) job speed, iii) use of consumable material, and iv) MFP wear and tear; and wherein:
the data includes a first data associated with a user's settings for the MFP device and at least one of the following: i) second data associated with a user's usage statistics for the MFP device, ii) third data which is real time data associated with the MFP device operation and iii) fourth data associated with MFP hardware characteristics; and the second data is associated with individual user usage for the following data including: the job size in page, the job/page size data, the length of time between jobs, the job/page receive time, the job/page process time, the job/page wait time, and usage peak time during the day.

25. The device of claim 24, further comprising:

a third memory configured to store third data which is real time data associated with the hardcopy input/output device operation; and a fourth memory configured to store fourth data associated with MFP hardware characteristics, wherein the controller is further configured to analyze at least one of the first through fourth data.

* * * * *